United States Patent Office 2,934,953
Patented May 3, 1960

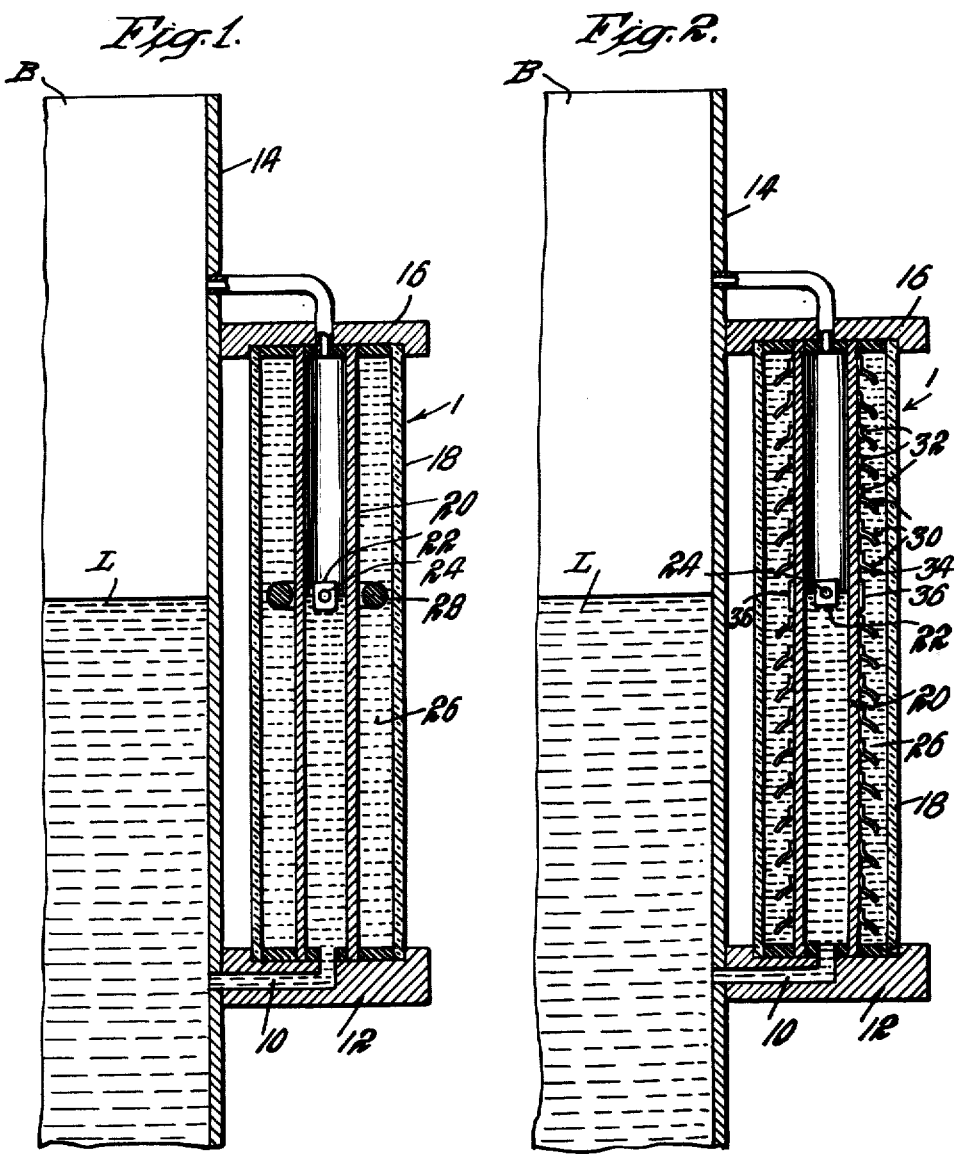

2,934,953

LIQUID LEVEL INDICATOR

Edward P. Anderson, Livingston, N.J., assignor, by mesne assignments, to Engelhard Industries, Inc., Newark, N.J., a corporation of New Jersey Application June 28, 1955, Serial No. 518,458

3 Claims. (Cl. 73—319)

This invention is concerned with a liquid level indicator and, more particularly, with the use of liquid level gages in connection with containers of liquids.

Liquid level gages are generally known, which consist of a glass tube mounted in liquid connection with an enclosed liquid within a container. For example, in steam boilers such glass type gages have become very common. However, it has been found that after a period of time, these gages become cloudy, and a reading of the water level becomes difficult. This problem becomes especially acute when the boilers, or other fluid containers, are subjected to high pressures and contain fluids at high temperatures. Glass type gages are not capable of withstanding such usage, and, after a period of time, it is noted that particles of rust obscure vision in the sight gage. In the case where the fluid containers are charged with salt, the high alkalinity of the liquid has been found to corrode and etch the glass.

It is an object of this invention to provide a simple liquid level gage for use in association with liquid containers which is capable of withstanding high temperatures or pressures, while providing a clear view of the liquid level. Other objects and advantages of the liquid level gage of the invention will become readily apparent upon a reading of the description hereinafter following and of the drawings forming a part thereof, in which:

Figure 1 is a partial cross-sectional view of one embodiment of the liquid level gage of the invention, and Figure 2 is a partial cross-sectional view of a second embodiment of the liquid level gage of the invention.

The liquid level indicator of the invention gives a visual indication of the liquid level by means of a float or other free moving member magnetically coupled through a non-magnetic member housing a magnet carried by a floating assembly which rides on the surface of the liquid within a tube which is in communication with the liquid within the container.

As shown in Figure 1, B represents a boiler, or other liquid container, which is in communication with a sight gage by a channel 10 formed within a lower supporting bracket 12 rigidly affixed to the outside wall 14 of the boiler, an upper bracket 16 is also affixed to the outside wall 14 of the boiler, and these brackets provide the support for the liquid level gage 1 of the invention. The gage consists of an outer tube 18 and an inner tube 20. These tubes are fitted at their ends within the brackets 12 and 16 into grooves suitably formed therein. The inner tube 20 may be formed of aluminum or other non-magnetic material, e.g. brass or stainless steel, which is capable of withstanding corrosion, high temperatures and pressures, or other conditions to which the liquid within the boiler is subjected. The body of liquid L within the boiler thus is at the same level within the tube 20 as it is within the boiler B. The body of liquid within the tube 20 has a float or other free-moving member 22 riding upon the surface thereon. The member 22 may be a cork float or it may be made of plastic, or material which can withstand high pressures and temperatures, etc. The float is non-magnetic. However, it contains a magnetic material 24 therewithin.

The outer tube 18 is made of glass or a clear plastic material and contains, in the annulus between the inner and outer tubes, a body of liquid 26 which may entirely fill the annulus. This liquid may be a silicon liquid or other fluid which remains clear at all times. The arrangement of inner and outer tubes serves to magnify the outer surface of the inner tube so that if it were of a white color there would be provided a white background for cooperation with a slave float 28 moving in the body of liquid 26, which provides the indicating means for the liquid level within the boiler B. This float 28 may be a light metal or a non-magnetic material containing a magnetic toroid therewithin. Thus, as the level of the liquid L within the boiler varies, the level of the body of fluid within the inner tube 20, and hence the position of the float 22 will vary accordingly. The slave float 28 will be thus positioned coordinately with the float 22 to give a clear visual indication of the level of the liquid within the boiler. The fluid within the outer tube 18 thus serves to neutralize the gravity pull of the float so that the magnetic coupling does not have to work against the forces of gravity. Also, if the float 28 is colored black, the appearance of the device will be that of a thin black band against a white background.

Instead of using a slave float 28, the arrangement of Figure 2 substitutes metal disc-like sequins 30 secured at their upper ends 32 to the outside of tube 20. Thus, the float 22 will draw the lower ends 34 of the member 30 into a vertical position as shown at 36 in Figure 2 and thereby indicate the liquid level. The latter arrangement may be more desirable since it removes all possibility of losing magnetic continuity.

I have thus provided a novel sight gage in which the liquid within a liquid container is in contact with an inner tube constructed of a non-magnetic material, e.g. brass, etc., which possesses properties superior to glass for resisting extreme physical or chemical conditions of the liquid.

Although a specific embodiment of the invention has been described above, it will become readily apparent to those skilled in the art that various modifications of structure may be made without departing from the spirit or scope of the invention. Thus, the floats may be modified to prevent sticking or to prevent separation of the visible float from the magnetic field.

What I claim is:

1. A liquid level sight gauge comprising an elongated inner chamber, an outer chamber enclosing the inner chamber and having substantially the same length as the inner chamber, the outer chamber being transparent, first means within the inner chamber responsive to a liquid level therein, said first means comprising a float having a magnet associated therewith, and second means within the outer chamber responsive to the position of the first means, said second means comprising a plurality of individually movable magnetic components each secured directly to the outer surface of the inner chamber in positions spaced along the length of the inner chamber.

2. A liquid level sight gauge comprising an elongated inner chamber, an outer chamber enclosing the inner chamber and having substantially the same length as the inner chamber, the outer chamber being transparent, first means within the inner chamber responsive to a liquid level therein, said first means comprising a float having a magnet associated therewith, and second means within the outer chamber responsive to the position of the first means, said second means comprising a plurality of movable magnetic components secured directly to the outer surface of the inner chamber in spaced positions around the inner chamber.

3. A liquid level sight gauge according to claim 1 in which the space between the inner and outer chambers is filled with liquid.

References Cited in the file of this patent

UNITED STATES PATENTS

| | | |
|---|---|---|
| 2,558,118 | Yost | June 26, 1951 |
| 2,685,797 | Morschel | Aug. 10, 1954 |

FOREIGN PATENTS

| | | |
|---|---|---|
| 535,746 | Germany | Oct. 15, 1931 |
| 841,953 | Germany | July 29, 1954 |